M. FISCHER.
INTERCHANGEABLE WHEEL OF MOTOR CARS.
APPLICATION FILED SEPT. 17, 1912.
1,106,345.
Patented Aug. 4, 1914.
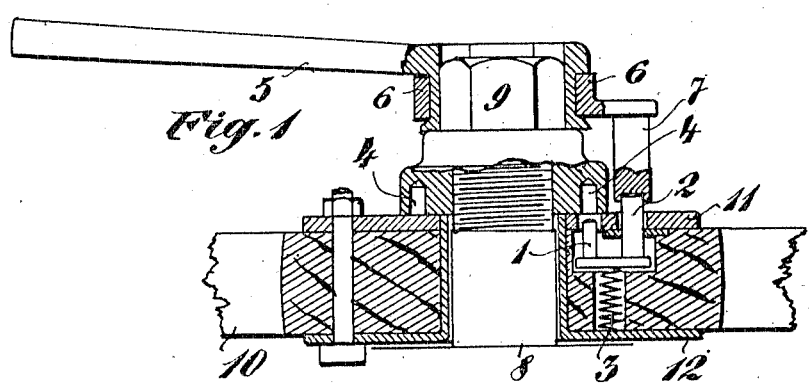
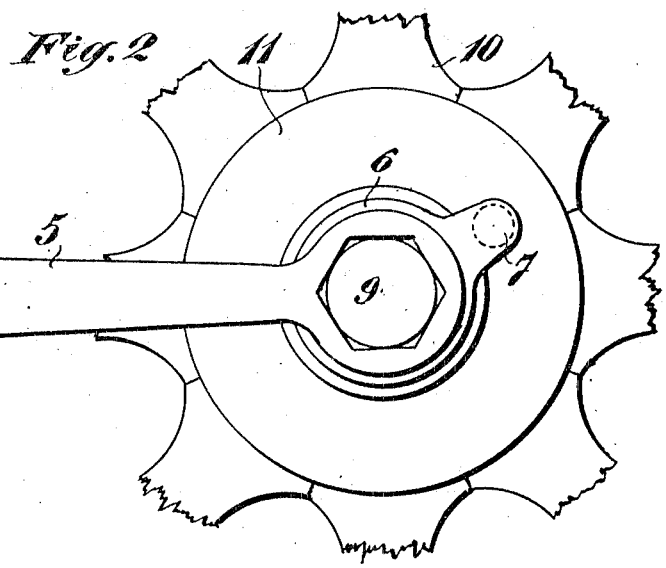
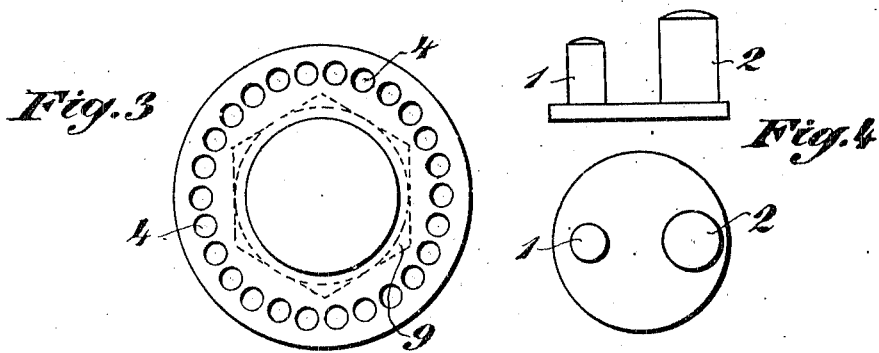

UNITED STATES PATENT OFFICE.

MARTIN FISCHER, OF ZURICH, SWITZERLAND, ASSIGNOR, BY MESNE ASSIGNMENTS TO JOHN T. PRATT, OF NEW YORK, N. Y.

INTERCHANGEABLE WHEEL OF MOTOR-CARS.

1,106,345.   Specification of Letters Patent.   Patented Aug. 4, 1914.

Application filed September 17, 1912. Serial No. 720,879.

*To all whom it may concern:*

Be it known that I, MARTIN FISCHER, a citizen of Switzerland, residing at Zurich, Switzerland, have invented new and useful Improvements in Interchangeable Wheels of Motor-Cars, of which the following is a specification.

This invention relates to means for demounting wheels, as in motor cars, so that an entire new wheel with tire may be replaced in case of puncture, instead of replacing the tire alone.

More particularly, the invention relates to the means of detachably securing the hub to the spokes or wheel nave.

The objects of the invention are to produce a simple and strong construction in which the attachment can be quickly made, and the parts coöperating to effect this result may be strong and durable, and not liable to derangement.

In the accompanying drawings forming part hereof,—Figure 1 is a section through the axes of the hub; Fig. 2 is an elevation of the hub with detaching wrench in position; Fig. 3 is the bottom view of the locking cap; Fig. 4 shows in two views, elevation and plan, the lock;—which illustrations are of the particular form of my embodiment.

Referring to the drawings, 10 are wooden spokes supported on a flange or spoke hub, 12 having bolts passing through it and the wooden spokes and clamping on the other side, a perforated flange 11. The axle 8, is threaded at one end to receive a cap, 9, formed with a hexagonal outer end, and having its inner end spread to form the flange to engage the perforate flange 11 attached to the spokes.

A recess is formed in the inner end of one of the wooden spokes in which is seated a lock shown in Fig. 4, with a locking pin 1, and operating peg 2. Both pin and peg pass through holes in flange 11, and are formed on a plate which is spring pressed outwardly so that under the pressure of the spring 3, the pin 1, will project beyond the plate, 11. The locking cap 9 being screwed on to the axle 8, will clamp the wheel hub between it and on the axle against which plate 12 abuts. When so screwed on, the inner face of cap, 9 having perforations 4, as shown in Fig. 3, can be tightened to the degree desired, whereupon the locking pin 1 is allowed to project, by the action of spring 3, so as to engage one of the holes 4, thereby locking the cap absolutely in position.

In order that the pin 1 may not prevent the tightening up of the cap 9, it is pressed inwardly so that its end is below the surface of plate 11, by pressure on the peg 2. This peg 2 is engaged by projection 7 from a loose ring 6, supported on the wrench 5. By inserting the wrench 5 on the outer end of cap 9, the loose ring is turned so that the projection 7 engages peg 2, and the peg and also the pin 1 will thereby be depressed when the wrench is in position to turn the cap, and while the wrench turns, the loose ring 6 does not, and peg 2 remains depressed until the lock cap has been screwed home, whereupon the loose ring is turned to disengage 7 from peg 2, when a slight turn of the cap is all that will be necessary to insure the pin 1 engaging one of the holes 4 on the inside of the locking cap. In a similar manner, when it is desired to release the cap, the wrench is applied and projection 7 engaged with peg 2 thereby depressing the pin 1, and releasing the cap 9, so that it can be immediately unscrewed. The wrench 5 and its projection 7 are made of such length with relation to the head and flange of the locking cap 9 so that engagement with peg 2 will always keep pin 1 clear of the face of the locking cap, so that as the cap is screwed home, it will never engage the pin until peg 2 is voluntarily released.

It will be clear that various modifications in detail can be made in the practice of my invention, and

What I claim and desire to secure by Letters Patent is:—

1. An interchangeable wheel for motor cars, a main axle, a wheel hub with flanges adapted to be supported on said axle, a securing cap having threaded engagement with the axle end and having perforations on the inner side of the cap, a depressible pin in the wheel hub adapted normally to project through the wheel hub flange to engage one of the perforations on the locking cap, a peg rigidly connected with the locking pin adapted to project through the wheel hub flange outside of the periphery of the locking cap flange for the purpose described.

2. The combination with an interchangeable wheel for motor cars, a spoke hub, an axle, a screw cap engaging said axle and having an outer angular head and an inner spread flange to engage the outer side of the spoke hub, a flange on the outer side of the spoke hub, a plurality of perforations on the face of the cap flange engaging the spoke hub, a double pin lock, a spring to press said lock so that the two pins normally project through the wheel hub flange one of said pins being so positioned as to engage the perforations on the cap flange and the other of said pins projecting beyond the cap flange.

3. In combination, an axle threaded at its outer end, a hub provided with a face plate having openings registering with a recess in the hub, a spring seated lock located in said recess, members on said lock adapted to project through the openings in the face plate, and a cap for engaging the threaded end of the axle and having openings to receive one of the members of the lock.

In testimony whereof I have signed my name to this specification in the presence of two subscribing witnesses.

MARTIN FISCHER.

Witnesses:
JOHANNES ALEMUND,
LINDA ADLER.